US007008472B2

(12) United States Patent
Fornof et al.

(10) Patent No.: US 7,008,472 B2
(45) Date of Patent: Mar. 7, 2006

(54) SPIN-ON FILTERING OIL REMOVAL CARTRIDGE

(75) Inventors: William P. Fornof, Girard, PA (US); Gregory Ashley, Amherst, OH (US); Leonard Quinn, Lagrange, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 10/353,285

(22) Filed: Jan. 29, 2003

(65) Prior Publication Data

US 2003/0110949 A1 Jun. 19, 2003

Related U.S. Application Data

(63) Continuation-in-part of application No. 09/880,493, filed on Jun. 13, 2001, now Pat. No. 6,527,839.

(51) Int. Cl.
*B01D 53/02* (2006.01)
*B01D 47/00* (2006.01)

(52) U.S. Cl. ............................ 96/136; 55/315; 55/502; 55/510; 55/DIG. 17

(58) Field of Classification Search .................. 96/134, 96/135, 136; 55/315, 495, 498, 501, 502, 55/505, 510, DIG. 17; 210/DIG. 17
See application file for complete search history.

(56) References Cited

U.S. PATENT DOCUMENTS

| | | | | |
|---|---|---|---|---|
| 875,432 A | | 11/1907 | Hetlesaeter | |
| 3,252,270 A | | 5/1966 | Paul et al. | |
| 3,527,027 A | | 9/1970 | Knight et al. | |
| 3,572,008 A | | 3/1971 | Hankinson et al. | |
| 4,203,739 A | | 5/1980 | Erdmannsdorfer | |
| 4,311,439 A | | 1/1982 | Stofen | |
| 4,468,239 A | | 8/1984 | Franz | |
| 4,519,819 A | | 5/1985 | Franz | |
| 4,632,682 A | * | 12/1986 | Erdmannsdorfer | 55/498 |
| 4,883,023 A | | 11/1989 | Tsang et al. | |
| 4,892,569 A | | 1/1990 | Kojima | |
| 5,002,593 A | | 3/1991 | Ichishita et al. | |
| 5,087,178 A | | 2/1992 | Wells | |
| 5,110,327 A | | 5/1992 | Smith | |
| 5,429,101 A | | 7/1995 | Uebelhoer | |
| 5,607,500 A | | 3/1997 | Shamine et al. | |
| 5,674,393 A | | 10/1997 | Terhune et al. | |
| 5,779,772 A | | 7/1998 | Unger et al. | |
| 5,851,269 A | | 12/1998 | Strope | |
| 5,961,698 A | | 10/1999 | Dossaji et al. | |
| 6,076,272 A | | 6/2000 | Conklin, III et al. | |

(Continued)

FOREIGN PATENT DOCUMENTS

| | | |
|---|---|---|
| EP | 0875432 | 11/1998 |

*Primary Examiner*—Frank M. Lawrence
(74) *Attorney, Agent, or Firm*—Eugene E. Clair

(57) ABSTRACT

A serviceable filtering oil removal cartridge for use in a compressed air assembly of a vehicle air brake system includes a housing having a first end and a second end. A filtering element is disposed within the housing for agglomerating and removing oil from compressed air entering the oil removal cartridge. A load plate is disposed within the housing for supporting the filtering element. The load plate includes a connecting portion dimensioned to allow the oil removal cartridge to be removed and installed as a single unit. The connecting portion is preferably a threaded annulus. A thermal vent can be included, wherein pressure is released from the oil removal cartridge upon reaching a threshold temperature.

21 Claims, 4 Drawing Sheets

U.S. PATENT DOCUMENTS 6,309,436 B1 10/2001 Holch
6,319,296 B1 11/2001 Fornof
6,358,300 B1 3/2002 Fornof et al.
6,514,051 B1 * 2/2003 Fornof et al. ............... 417/313
6,527,839 B1 3/2003 Fornof et al.
6,558,457 B1 5/2003 Kolcxyk
6,581,297 B1 * 6/2003 Ginder .......................... 34/79

* cited by examiner

FIG. 5
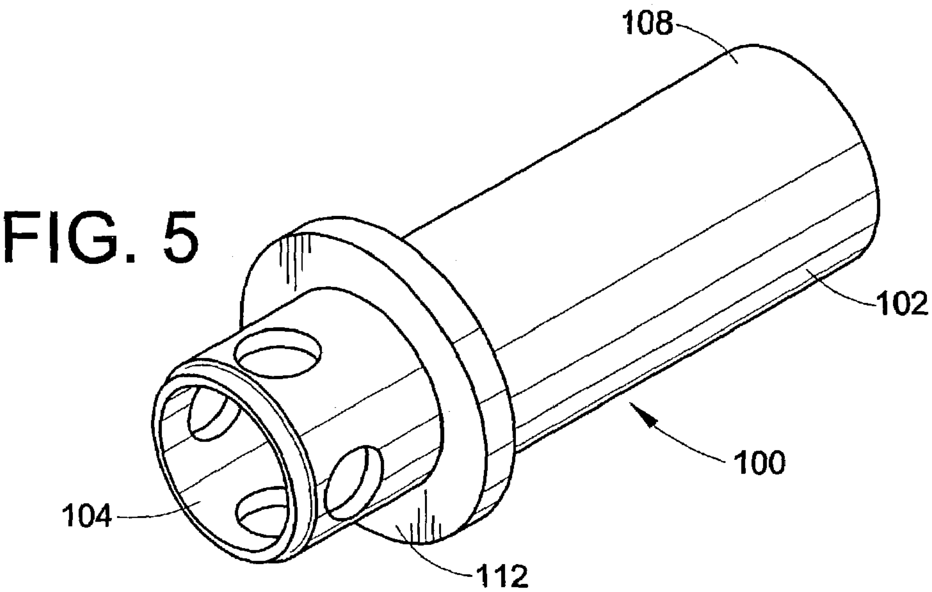
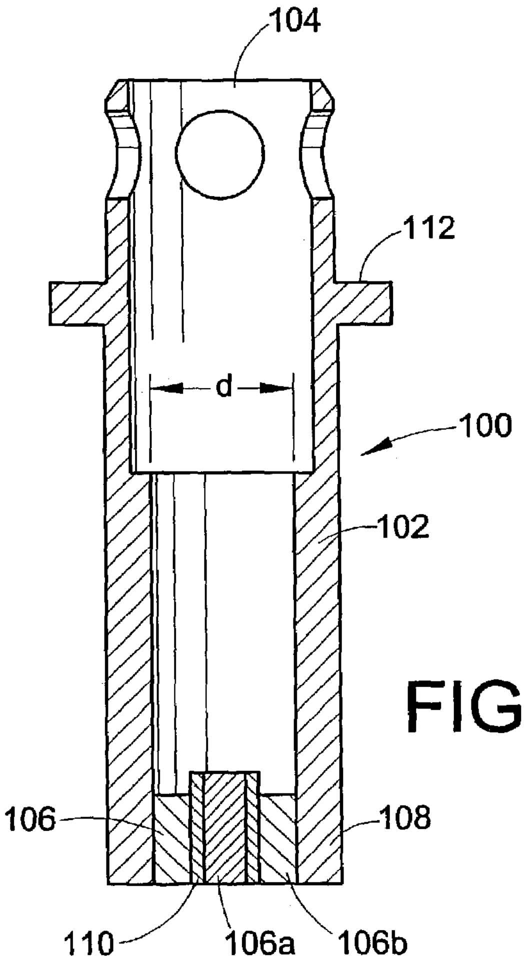
FIG. 6
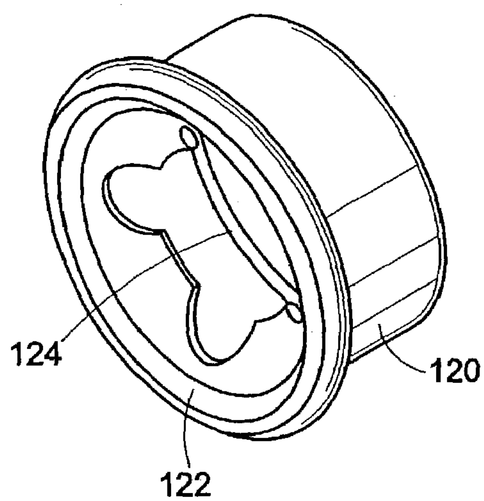
FIG. 7

SPIN-ON FILTERING OIL REMOVAL CARTRIDGE

RELATED APPLICATION

This application is a continuation-in-part of U.S. patent application Ser. No. 09/880,493, filed on Jun. 13 ,2001 for SPIN-ON FILTERING OIL REMOVAL CARTRIDGE, now U.S. Pat. No. 6,527,839 issued Mar. 4, 2003, the entire disclosures of which are fully incorporated herein by reference.

BACKGROUND OF THE INVENTION

1. Field of the Invention

The present invention relates to oil removal devices used in combination with compressed air, heavy vehicle braking systems. More particularly, this invention is directed to a spin-on filtering oil removal cartridge disposed downstream from an air brake compressor that is easy to assemble and install, and which is easily serviced.

2. Discussion of the Art

Compressed air systems are used in brake systems to provide and maintain air under pressure to operate vehicle brakes and associated auxiliary air systems. Conventional systems include an air compressor for generating pressurized air and a drying device or air dryer disposed downstream from the compressor for removing entrained liquid from the air. The air dryer includes a desiccant material that removes water vapor from the air as it passes therethrough.

As will also be appreciated, air brake compressors are typically supplied with oil from the vehicle engine in order to lubricate the bearings and other components of the compressor. However, because oil is difficult to contain, it passes into the pressurized air stream exiting the compressor. Air exiting the compressor usually passes directly to the downstream components. As a result, elastomeric seals and seats of downstream components, as well as the desiccant material housed within the air dryer, often become contaminated with the oil accompanying the pressurized air.

In order to minimize oil contamination of the downstream components, attempts have been made to place a filtering element at or adjacent the inlet area of the air dryer. The filtering element or oil filter would effectively remove oil from the compressed air before reaching the desiccant material. However, when the compressed air reaches the air dryer, much of the water vapor and oil will have condensed since the compressor and air dryer are remotely spaced. The condensed water vapor and oil mixture forms a viscous emulsion. The condensed oil and water emulsion is high in viscosity and presents difficulties in draining the mixture. In addition, the filter must be equipped with a drain passage or system to dispose of the filtered material. Moreover, a relatively large draining capacity is required since a considerable amount of the water vapor condenses to liquid water upon reaching the air dryer. This, unfortunately, adds to the complexity and cost of the compressed air system.

Furthermore, water resulting from the condensed vapor has the potential to freeze. In order to prevent both freezing and the water vapor from condensing to form an emulsion, heaters have been incorporated into filter devices to maintain the water in liquid form. Again, however, the addition of a heating element adds to the complexity and cost of the compressed air system. In commonly assigned, co-pending application entitled "Compressor Discharge Oil Filter", (Ser. No. 09/810,280, filed Mar. 16, 2001 and published under publication no. 2002-0131874 on Sep. 19, 2002), a system is disclosed which addresses the foregoing shortcomings, namely reducing contamination of components downstream from a vehicle air brake compressor without having to use a complex drainage system or a separate heating element. In this application, a discharge oil filter has been placed proximate to the air compressor for filtering oil before reaching and contaminating the downstream components. The strategic placement of the filter allows oil to be effectively removed before emulsions have the opportunity to form and before moisture cools and condenses into a liquid. The cited application is expressly incorporated herein by reference.

While it is important to maintain the oil filter at an elevated temperature, thereby avoiding emulsions, it is also important not to allow the temperature at the oil filter to reach the flash point of the oil therein. Oil, at the pressure of the compressor discharge, will ignite around 400° F. If oil ignites within the oil filter it can cause major damage to the vehicle. Normally, the compressor discharge is around 350° F., well below the flash point of oil.

The present invention is directed to an improvement to the above-cited application and in particular to an improvement to the oil removal device. Typical oil filters used in combination with air compressor systems include a cartridge having a housing enclosing a filter element. To change the filter element, a user needs to disassemble the housing which is cumbersome and often requires the use of special tools. The used or defective filter element must be removed and replaced with a new filter element. Oftentimes, a sump needs to be emptied which creates the risk of liquids spilling and damaging the system. After the new filter element has been installed, the user must make sure the housing is tightened and properly pressurized. These steps require considerable time and cause the removal and installation process to be rather complex. Accordingly, a need exists to provide an oil removal cartridge that is quick and easy to remove and install.

SUMMARY OF THE INVENTION

The present invention provides a spin-on filtering oil removal cartridge for an air compressor system used in pneumatic brake applications that meets the above needs and others in a simple and economical manner.

More particularly, the invention provides a compressed air system for an air brake system having a compressor for generating a stream of compressed air. A disposable oil removal cartridge is disposed downstream from the compressor for filtering oil from the stream of compressed air. In one embodiment, the oil removal cartridge has an outer housing enclosing a filtering element and a load plate for supporting the filtering element. In another embodiment, the load plate includes a connecting portion dimensioned to allow the oil removal cartridge to be removed and installed as a single unit. In another embodiment, the filter element is connected by a threaded annulus.

Another aspect of the present invention is a thermal vent located within the oil removal cartridge for controlling the temperature of the compressed air system. In one embodiment, a plug is disposed within a thermal vent housing and upon reaching the melting point of the plug composition, the plug ruptures releasing pressure to atmosphere.

This invention is also directed to a method for installing and removing an oil removal cartridge from a compressed air system of a vehicle air brake system. One embodiment of the method includes the step of engaging a threaded annulus, defining a passage in the load plate, with a threaded member of a body assembly. When the cartridge needs to be replaced, the threaded annulus is threadably disengaged from the threaded member of the body assembly.

BRIEF DESCRIPTION OF THE DRAWINGS

FIG. 5 is a prospective view of a thermal vent for an oil filter;

FIG. 6 is a cross-sectional view of a thermal vent; and

FIG. 7 is a prospective view of a cap for a thermal vent.

DETAILED DESCRIPTION OF THE PREFERRED EMBODIMENTS

Figure 1:
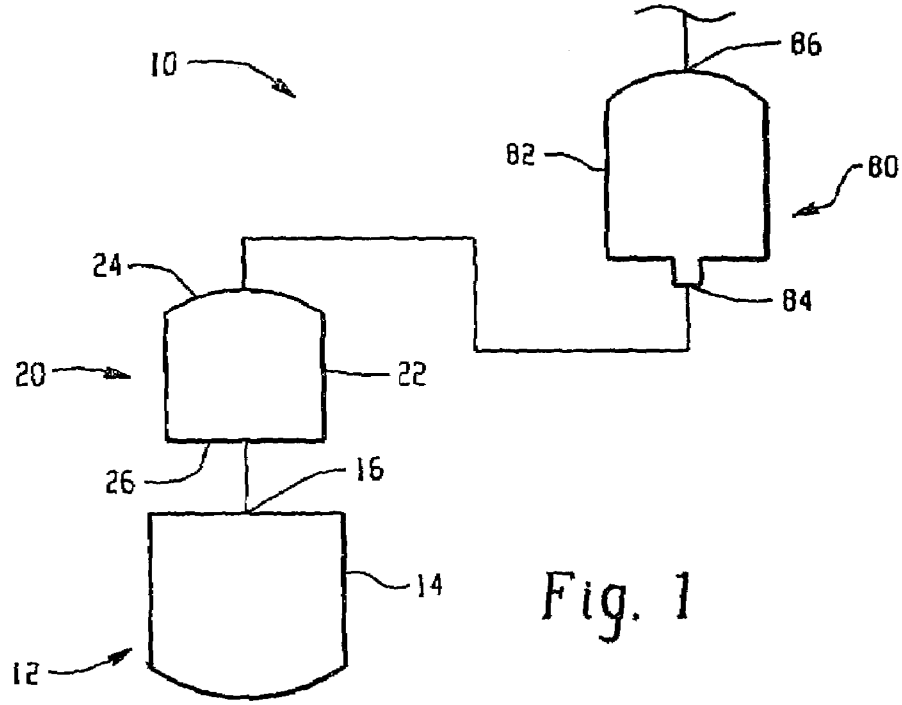
FIG. 1 is a schematic view of a compressed air system for a vehicle brake system in accordance with the present invention.

In FIG. 1, a compressed air system 10 for an air brake assembly is shown in accordance with the present invention. The compressed air system includes a compressor 12 having a crank case 14 which houses portions of the compressor. The compressor pressurizes air in a conventional manner, for example, by using a piston (not shown) slidable within a bore (not shown) of the crank case. Dynamic components of the compressor, such as a crank shaft and piston and bore, are lubricated with oil delivered from a vehicle engine or other means (not shown). Oil migrates into the pressurized air stream which exits the compressor through a port 16 of the compressor. Due to the relatively high operating temperature of the compressor, oil exiting the port is generally in the form of aerosols.

Figure 2:
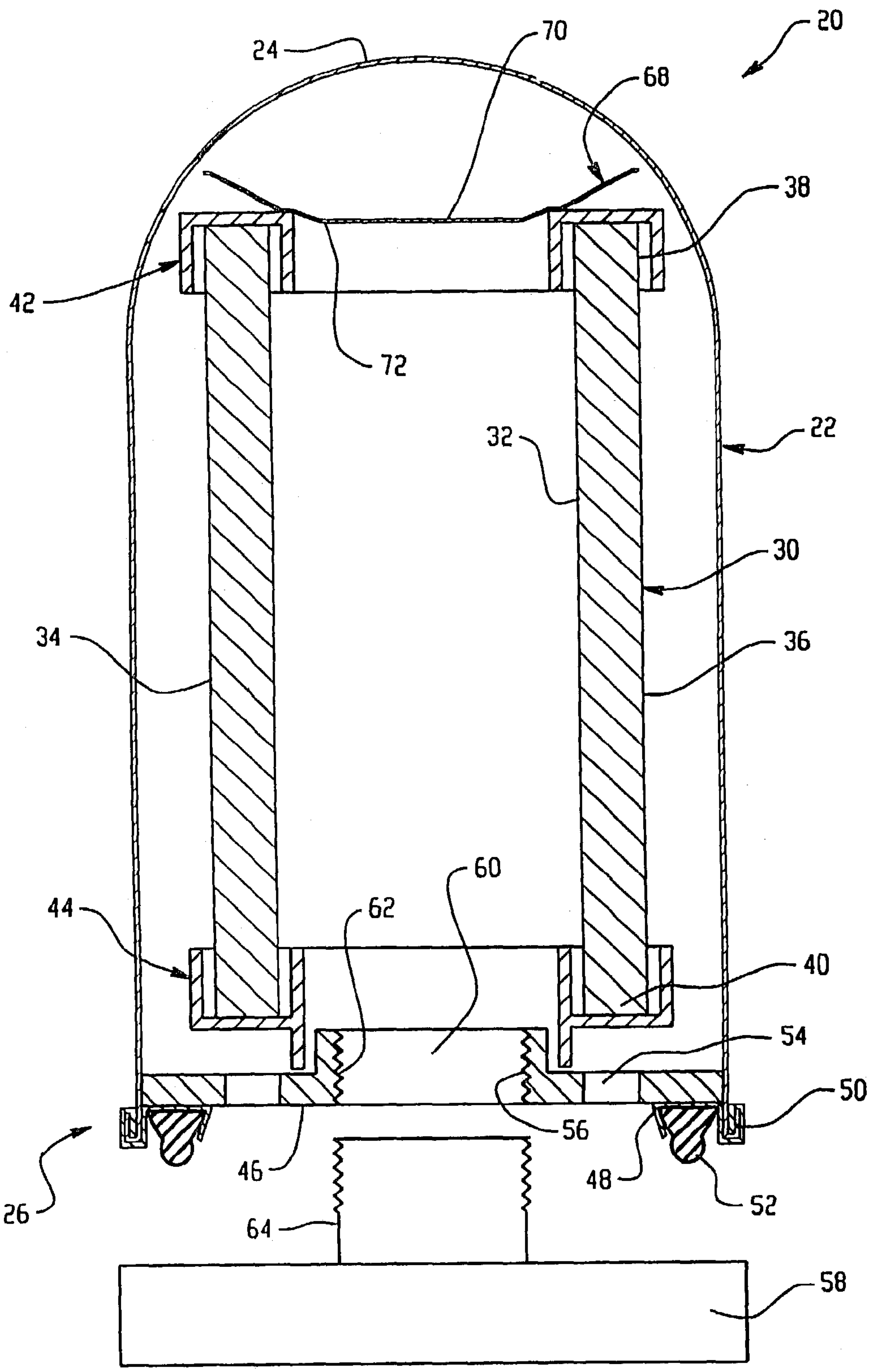
FIG. 2 is an elevational view of a spin-on filtering oil removal cartridge in accordance with the present invention.

With reference also to FIG. 2, an oil removal cartridge 20 is disposed near the port of the compressor for removing oil from the compressed air stream. The oil removal cartridge includes an outer housing 22, preferably made from a metal material, having a first upper closed end 24 and a second lower open end 26.

Disposed within the housing is a filtering element 30 configured to agglomerate oil passing therethrough. The filtering element is annular in shape having a first or inner wall 32 and a second or outer wall 34 which together define a chamber containing a filtering media 36. Inner and outer walls are preferably made from a perforated material, and the filtering media is preferably a fiber material capable of filtering out small particles. In one embodiment, the filter material is made from a wound fibrous material. In one embodiment the filter material is made from wound micro glass filaments; however other embodiments incorporate other wound synthetic materials. The filtering element includes a first or upper axial end 38 and a second or lower axial end 40. First and second end caps 42, 44 are attached to the first and second axial ends, respectively, of the filtering element. The end caps are preferably adhesively secured to the filtering element, but may be secured in any other suitable manner without departing from the present invention.

The filtering element 30 and end caps are supported within the housing by a load plate 46 located at the housing lower end 26. Sheet metal 48 is secured (e.g., welded) along an outer perimeter of the load plate and is crimped with an edge of the housing lower end 26 to form a first seal 50. Alternatively, a portion of the load plate can be crimped with the edge of the housing lower end to form the first seal. The first seal minimizes leakage of pressure generated by the compressor and used to power vehicle pneumatic systems, such as the air brake system. A second seal 52 is provided on a lower surface to further minimize pressure leakage. The second seal is preferably made from an elastomeric material, that conforms to another surface and effectively establishes a seal therewith. However, other suitable seal materials may be used.

Openings 54 are provided in the load plate 46 and allow the compressed air and oil to enter and exit the oil removal device. In a preferred embodiment, eight (8) openings are circumferentially spaced around the load plate but other numbers of openings are possible. The load plate further includes a connecting portion 56 for connecting the oil removal device to a head assembly 58. The connecting portion is preferably an annulus extending from a top surface of the load plate and defining a passage 60 extending therethrough. The annulus includes threads 62 disposed on the inner surface of the annulus which are preferably ¾" by 20" threads. However, other suitably sized threads are contemplated.

The threaded annulus has a smaller diameter than that of the filtering element 30. The threaded annulus is dimensioned to allow the oil removal device to be spun onto a hollow threaded stud member 64 extending from the head assembly 58. Although a threaded annulus has been disclosed as the preferred connecting portion, it should be appreciated that other suitable connecting members are contemplated by the present invention. For example, the connecting portion could snap or frictionally fit to the head assembly.

A biasing member 68, such as a spring, is disposed at an opposite end of the filtering element 30 for continuously urging the filtering element toward the load plate 46. The biasing member 68 is preferably a spring member having an intermediate portion 70 that fits within a recess 72 of the upper end cap 42. Of course, it will be appreciated that the filtering element 30 may be secured via other means such as, for example, an interference fit and such alternative securing means are within the scope and intent of the present invention as defined by the claims herein.

The oil removal cartridge 10 is strategically positioned so that oil may be effectively filtered without the use of complex drainage systems or heating elements. More specifically, air brake compressors and other heat generating elements of a vehicle operate at temperatures sufficiently elevated to maintain water in a vapor state. The oil removal cartridge of the present invention is located near one of these heat generating elements, such as the compressor shown in FIG. 1, so that water in the air stream is maintained in a vapor state. In other words in accordance with the present invention, the oil removal cartridge advantageously uses the heat generated by the compressor, or any other suitable heat generating element, to prevent the water vapor from condensing.

As shown in FIG. 1, the heat generating element is preferably a compressor 12. However, any heat producing element can be alternatively used such as an engine block. In a preferred embodiment, the oil removal cartridge is located near the compressor so that the temperature of the air stream through the filtering element is high enough to minimize water condensation. Accordingly, the filtering element is able to mostly filter oil, rather than filtering both oil and water or oil/water emulsions.

By mostly filtering oil, the need for complex water drainage systems is eliminated. In addition, the need for a separate heating element is also eliminated by advantageously using the heat supplied from the compressor or other heat source. Moreover, maintaining the air stream at an elevated temperature during oil filtration prevents water from freezing and, thus, the attendant problems associated therewith.

Figure 3:
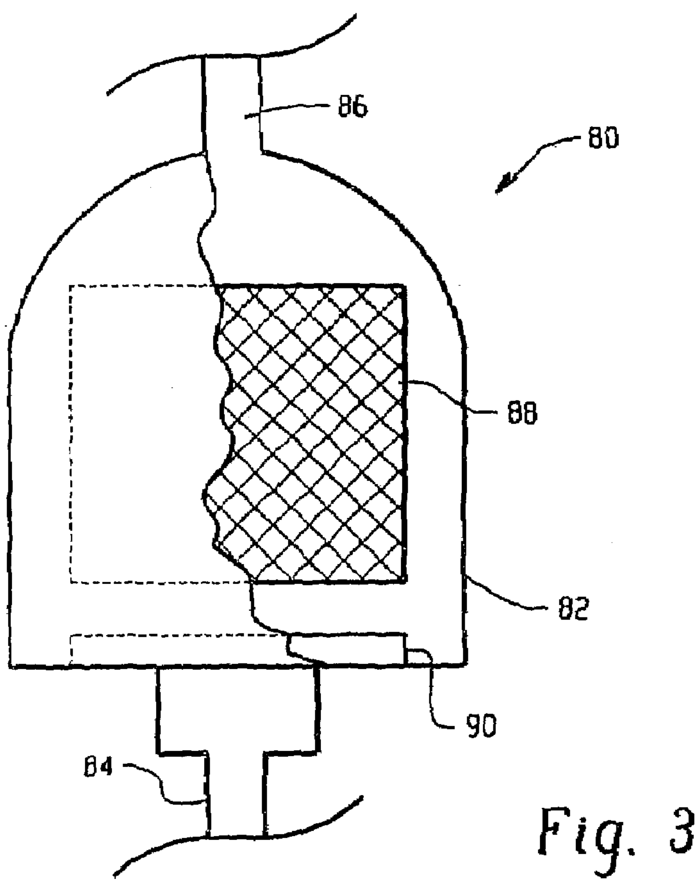
FIG. 3 is an elevational view of an air dryer shown in partial cross-section.

With reference also to FIG. 3, the compressed air system typically further includes an air dryer 80, as well as other components (not shown) located downstream from the oil removal cartridge. The air dryer has a housing 82 with an inlet 84 where compressed air enters and an outlet 86 where compressed air exits. A drying agent or desiccant material 88 is enclosed by the housing and operates to remove water and water vapor from the compressed air in a conventional, well-known manner. Optionally, the air dryer includes a filter 90 located near its inlet for removing any remaining oil or other foreign matter that might still be entrained in the compressed air stream. However, due to the remote location of the air dryer from the compressor this filter 90 would be ineffective by itself in achieving the objectives of the present invention. In an alternative embodiment, the air dryer 80 may be a membrane air dryer.

In operation, the compressor 12 pressurizes air which exits at port 16. Upon exiting the port 16, the compressed air enters the oil removal cartridge 10 through openings 54. The compressed air travels axially in the housing and radially through the filtering element 30 where the filtering media 36 removes oil from the compressed air. Although this is the preferred direction, the opposite flow direction is also acceptable. When the oil enters the oil filter, it is substantially segregated, i.e., in the form of aerosols. These aerosols are filtered by the removal media and agglomerated into larger particles or oil droplets. The agglomerated oil droplets are subsequently drained from the system or alternatively the oil droplets are transported to the engine sump (not shown) or recycled back to the air compressor.

When one of the components of the oil removal cartridge 10 (i.e. the filtering element 30) needs replacement, the cartridge is simply rotated and spun-off the body assembly. The entire cartridge is then replaced and a new cartridge is simply spun-on. This provides significant advantages over conventional oil removal devices which are much more complex and time consuming to remove and install. More particularly, changing conventional filter elements requires a user to disassemble the device which often requires the use of special tools. The used or defective filter element must be removed and properly replaced with a new filter element. Oftentimes, a sump needs to be emptied which creates the risk of spilling liquids and damaging the system. After the new element has been installed, the user must make sure the housing device is tightened and properly pressurized. These steps require considerable time and cause the removal and installation process to be rather complex. In addition, these cartridges are generally larger and waste valuable space. The oil removal cartridge of the present invention is simple to install/remove and is relatively small compared to existing models.

Figure 4:
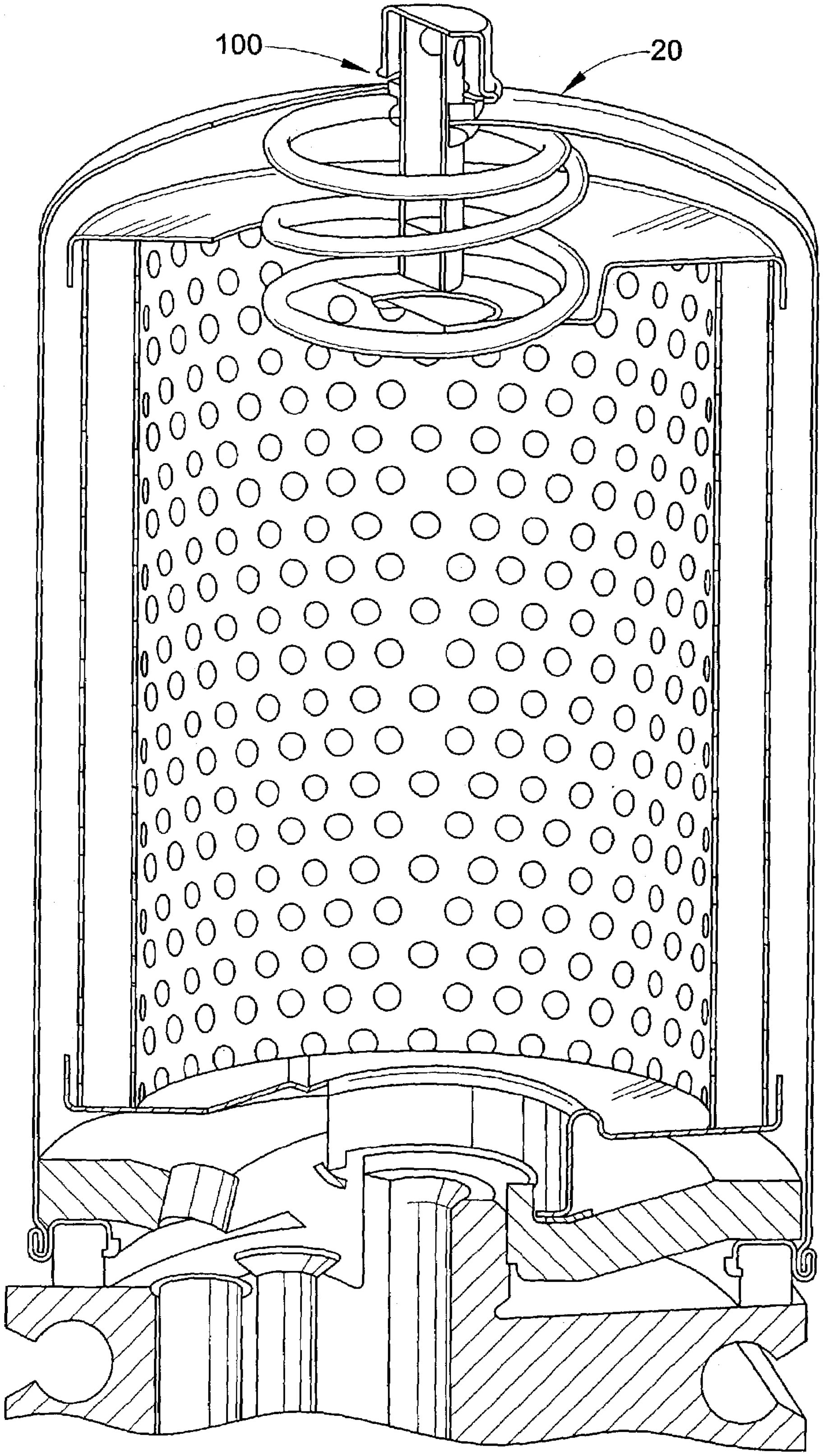
FIG. 4 is a cross-sectional view of an oil filter incorporating a thermal vent.

As shown in FIG. 4, the oil removal cartridge may also include a thermal vent 100. The thermal vent 100 is designed such that when the temperature within the oil removal cartridge reaches a threshold temperature, the thermal vent melts and allows compressed air to be released to atmosphere, which subsequently lower the system pressure and temperature. Thermal vent 100 includes a housing 102, a vent port 104, and a plug 106 located in the bottom portion 108 of the thermal vent housing 102. In one embodiment, the plug 106 is divided into an inner plug 106*a* and an outer plug 106*b*, which are separated by sheath 110. The sheath is preferably made from copper or brass. The thermal vent housing 102 is preferably cylindrically shaped and made from tubing, such as, for example, ¼" copper tubing, with a sealing ring 112 located towards the vent port 104. The top portion 112 of the housing 102 may also include a number of additional release ports 114. The plug 106 fills the bottom portion 108 of the thermal vent to provide an airtight seal.

While the plug 106 can be made from a variety of materials, it is desirable to provide a plug that melts at within a selectable temperature range. Since the flashpoint of oil vapor is approximately 400° F., the thermal vent should contain a plug 106 with a melting point under 400° F., preferably between about 250° F. and about 350° F.; although these temperatures can vary as determined by pressure, the type of system, and the desired rupture point. Since it is desirable for the plug 106 to completely melt and thereby allow discharge of the compressed air as soon as the threshold temperature is reached, it is also preferable to use a plug 106 that is eutectic. As such, the plug 106 may be made from a solder, alloy, or any other suitable material. In one embodiment, the inner plug 106*a* is made from a solder comprising about 55.5% bismuth and 45.5% lead, while the outer plug 106*b* is made from a solder comprising about 43% tin, about 43% lead, and about 14% bismuth. Using such compositions, the inner plug 106*a* has a rupture temperature of about 255° F. and the outer plug 106*b* has a rupture temperature of about 290–325° F. Other illustrative example of the composition of the stop are about 96.5% tin and about 3.5% silver (melting temperature at approximately 430° F.); about 60% tin and about 40% lead (melting temperature at approximately 370° F.); or tin-zinc, tin-silver, tin-silver-copper, tin-silver-nickel, tin-copper, tin-lead-silver, bismuth-tin, or INDALLOY® alloys. It should be appreciated that these compositions are merely illustrative examples and the scope of the present invention should not be limited by or to such examples.

The plug 106 is about 0.15 inches in thickness and spans the width of the thermal vent housing 102 diameter d. The diameter of the inner plug 106*a* is approximately 0.062 inches. The plug 106 is held within the thermal vent housing 102 by the solder material; however, one of ordinary skill in the art should appreciate that the plug may be welded, crimped, friction-fitted, or glued into the thermal vent housing. Once the inner plug 106*a* ruptures, compressed air immediately exits the compressed air system, thereby lowering the temperature within the system. In addition, the melting of the plug and the release of the compressed air provides a noise that operates as an audible warning to the vehicle operator. If the temperature continues to increase, the outer plug 106*b* will melt, allowing additional pressure to be released from the system. The audible warning signal increases when the outer plug ruptures. In addition, electrical sensors, such as transducers, may be placed at the thermal vent port 104 to trigger an electrical warning to the vehicle operator upon the detection of the pressure release. The size of the two different plugs are designed such that the rupture of the inner port 106*a* will not adversely effect the operation of the vehicle braking system, whereas the rupture of the outer port 106*b* will interfere in pumping up the vehicle braking system, thereby allowing only five or six more complete brake applications. Once the pressure in the brake system reaches a minimum threshold, the primary brakes will not be capable of actuation and the spring brakes will be applied to ensure that the vehicle does not continue to operated until the problem that caused the thermal vent rupture is repaired.

Additionally, cap 120 shown best in FIG. 7 can be applied to the top of the thermal vent port 104 to collect the solder from the plug 106 upon melting. The cap 120 fits on top of the vent port 104 and allows the pressure to be released from the underside 122, while the solder or other plug material is collected within the inner portion 124. The cap 120 reduces the introduction of the plug material to the environment.

The invention has been described with reference to the preferred embodiments. Obviously, modifications and alterations will occur to others upon a reading and understanding of the detailed description. The invention is intended to include all such modifications and alterations insofar as they come within the scope of the accompanying claims and the equivalents thereof.

Having thus described the preferred embodiment, the invention is now claimed to be:

1. A compressed air system for an air brake assembly comprising:

a compressor for generating pressurized air for use in operating the air brake system;

a serviceable oil removal cartridge disposed downstream from the compressor for filtering oil from the pressurized air, the oil removal cartridge having an outer housing enclosing a filtering element and a load plate for supporting the filtering element, wherein a plurality of openings are provided in the load plate for allowing the pressurized air to enter or exit the oil removal cartridge, the load plate including a threaded annulus dimensioned to allow the oil removal cartridge to be removed and installed as a single unit, wherein the threaded annulus includes a passage for allowing the pressurized air to enter or exit the oil removal cartridge;

and an air dryer disposed downstream from the oil removal cartridge for removing water from the pressurized air.

2. The compressed air system according to claim 1, further comprising a body assembly having a hollow member dimensioned to be threadably received by the threaded annulus.

3. The compressed air system according to claim 1, wherein the threaded annulus has a smaller diameter than a diameter of the filtering element.

4. The compressed air system according to claim 3, wherein the threaded annulus is concentric with the filtering element.

5. The compressed air system according to claim 1, wherein a portion of the load plate is crimped with a portion of the outer housing to form a first seal.

6. The compressed air system according to claim 1, further comprising a metal piece operatively associated with the load plate and crimped with a portion of the outer housing to form a first seal.

7. The compressed air system according to claim 6, further comprising a second seal operatively connected to a surface of the metal piece.

8. The compressed air system according to claim 1, further comprising first and second end caps mounted to opposed ends of the filtering element.

9. The compressed air system according to claim 1, further comprising a biasing member disposed within an upper portion of the housing for applying a continuous force against the filtering element.

10. The compressed air system according to claim 1, wherein the filtering element is annular in shape having a support which defines a chamber for containing a filtering media.

11. A compressed air system comprising:

(a) a compressor for generating compressed air;

(b) a removable& oil removal cartridge disposed downstream from the compressor for agglomerating and removing oil vapor entrenched in the compressed air, wherein the oil removal cartridge comprises:

(i) a housing including an air inlet and an air outlet and a threaded annulus for securing the cartridge onto another threaded member; wherein the threaded annulus includes a passage for allowing the pressurized air to enter or exit the oil removal cartridge; and (ii) a filtering element disposed within the housing between the inlet and outlet, wherein said filtering element is a fibrous material and includes an elongated surface parallel to the flow of air entering the inlet of the housing along which the compressed air may pass and a width perpendicular to said inlet air flow through which the compressed air passes to reach the air outlet; and (c) an air dryer disposed downstream from the oil removal cartridge for removing water from the compressed air.

12. A filter apparatus for a compressed air system for an air brake system comprising:

means for receiving air from a compressor which generates pressurized air for use in operating the air brake system;

a serviceable oil removal cartridge disposed downstream from the compressor for filtering oil from the pressurized air, the oil removal cartridge having an outer housing enclosing a filtering element and a load plate for supporting the filtering element, wherein at least one opening is provided in the load plate for allowing the pressurized air to enter or exit the oil removal cartridge, the load plate including a threaded annulus dimensioned to allow the oil removal cartridge to be removed and installed as a single unit, wherein at least one opening is provided in the threaded annulus for allowing the pressurized air to enter or exit the oil removal cartridge; and means for providing air to an air dryer disposed downstream from the oil removal cartridge which removes water from the pressurized air.

13. The filter apparatus according to claim 12, further comprising a body assembly having a hollow member dimensioned to be threadably received by the threaded annulus.

14. The filter apparatus according to claim 12, wherein the threaded annulus has a smaller diameter than a diameter of the filtering element.

15. The filter apparatus according to claim 14, wherein the threaded annulus is concentric with the filtering element.

16. The filter apparatus according to claim 12, wherein a portion of the load plate is crimped with a portion of the outer housing to form a first seal.

17. The filter apparatus according to claim 12, further comprising a metal piece operatively associated with the load plate and crimped with a portion of the outer housing to form a first seal.

18. The filter apparatus according to claim 17, further comprising a second seal operatively connected to a surface of the metal piece.

19. The filter apparatus according to claim 12, further comprising first and second end caps mounted to opposed ends of the filtering element.

20. The filter apparatus according to claim 12, further comprising a biasing member disposed within an upper portion of the housing for applying a continuous force against the filtering element.

21. The filter apparatus according to claim 12, wherein the filtering element is annular in shape having a support, which defines a chamber for containing a filtering media.

* * * * *